United States Patent [19]
Pink

[11] 3,921,133
[45] Nov. 18, 1975

[54] CONTROLLABLE TIMING DEVICE FOR SIGNALLING THE END OF AN INTERVAL

[75] Inventor: Ronald G. Pink, Franklin, Mass.

[73] Assignee: Honeywell Information Systems Inc., Waltham, Mass.

[22] Filed: Dec. 7, 1970

[21] Appl. No.: 95,734

[52] U.S. Cl. .............................................. 340/146.2
[51] Int. Cl.[2] .............................................. G06F 7/02
[58] Field of Search .................. 340/146.2; 235/177

[56] References Cited

UNITED STATES PATENTS

| | | | |
|---|---|---|---|
| 2,957,945 | 10/1960 | Packard | 340/146.2 X |
| 3,187,303 | 6/1965 | Chiapuzio et al. | 340/146.2 |
| 3,493,929 | 2/1970 | Webb | 340/146.2 |
| 3,576,533 | 4/1971 | Yokoyama | 340/146.2 |

*Primary Examiner*—David H. Malzahn
*Attorney, Agent, or Firm*—Nicholas Prasinos; Ronald T. Reiling

[57] ABSTRACT

A controllable timing device for generating a measure of a controllable interval following the occurrence of a predetermined event, wherein, after receiving an indication of such event, the device responds to a group of binary signals of which the aggregate state varies cyclically and delivers an output control signal when the state of at least a subset of said binary signals first repeats.

2 Claims, 3 Drawing Figures

| STATE | S2A1 | FBA1 | FB21 | FB11 | |
|---|---|---|---|---|---|
| 1 | 1 | 0 | 0 | 1 | TS1 |
| 2 | 1 | 0 | 1 | 0 | TS2 |
| 3 | 1 | 0 | 1 | 1 | TS3 |
| 4 | 1 | 1 | 0 | 1 | TS1A |
| 5 | 1 | 1 | 1 | 0 | TS2A |
| 6 | 1 | 1 | 1 | 1 | TS3A |
| 7 | 0 | 0 | 0 | 1 | TS1 |
| 8 | 0 | 0 | 1 | 0 | TS2 |
| 9 | 0 | 0 | 1 | 1 | TS3 |
| 10 | 0 | 1 | 0 | 1 | TS1A |
| 11 | 0 | 1 | 1 | 0 | TS2A |
| 12 | 0 | 1 | 1 | 1 | TS3A |

RONALD G. PINK
*Inventor*
By [signature]
*Attorney*

RONALD G. PINK
*Inventor*
By [signature]
*Attorney*

CONTROLLABLE TIMING DEVICE FOR SIGNALLING THE END OF AN INTERVAL

BACKGROUND OF THE INVENTION

This invention relates to timing devices, and more particularly to apparatus for providing a controllable delay following the occurrence of a predetermined event.

In complex systems, such as electronic data processing systems, it is frequently necessary to provide for automatically controlling the performance of a specified function following a predetermined interval after the occurrence of a particualr event. In data processing systems for processing signals representing binary digital data and which operate by employment of internal control signals representing the binary digits 1 and 0, a required delay interval between the occurrence of the event and the initiation of performance of the function is frequently provided in the prior art by employment of a monostable multivibrator, or one-shot. The one-shot is a circuit normally operative in a stable state, but adapted to operate in an unstable state for a predetermined duration following the application of a trigger signal thereto. The trigger signal, which may be a binary 1 control signal, is a start-indicating signal which denotes the occurrence of the event from which the delay interval is to start. Upon return of the one-shot to its stable state, a corresponding control signal is generated which is employed to initiate the specified function. However, the duration during which the one-shot operates in its unstable state, and which provides the required delay interval, depends primarily on circuit parameters and voltage levels, and, therefore, is not sufficiently precise for many applications.

When precise and accurate time delays have been required in the prior art, binary counters have been employed. The binary counter is used for counting and recording the receipt thereby of the pulses in a closely controlled pulse train. In such pulse train, the frequency of the pulses is carefully and closely controlled by a master system clock. Upon the occurrence of the particular event, the counter is enabled to count and record the number of pulses received from the pulse train. When the counter reaches a predetermined count, or when it overflows, a control signal is generated to initiate the specified function. However, such counter employs complex binary logic circuits for operation and, therefore, is relatively costly. In the type of system operation in which the counter must continuously stand by in order, at any random moment, to be able to initiate the required delay interval, costly apparatus, which is used only infrequently, is not used efficiently in this prior art embodiment.

Therefore, it is the principal of the instant invention to provide an accurate and inexpensive timing device.

Another object of the instant invention is to provide a device automatically controlling the performance of a specified function following a predetermined interval after the occurrence of the particular event.

Another object of the instant invention is to provide inexpensive apparatus for generating a measure of a predetermined interval following the occurrence of a start-indicating signal.

SUMMARY OF THE INVENTION

The foregoing objects are achieved, according to one embodiment of the instant invention, by providing apparatus which cooperates with any group of precisely timed binary control signals employed in a data processing system, provided that the state of such control signals varies cyclically, and provided further that the state of at least a subset of such control signals repeats at intervals substantially equal to the desired delay interval. A register having a binary storage cell for each signal of the binary control signal group is coupled to selectively receive the signal group and to store a binary representation of each signal received in a respective one of the cells. Each cell delivers an output signal corresponding to the binary representation stored therein. A controllable gate is coupled to receive the group of binary control signals provided by the data processing system, and to selectively transfer such signals to the register upon application of a signal denoting the occurence of the event from which a delay interval is to be measured. A comparator is coupled to receive both the group of output signals delivered by the register and the aforementioned group of binary control signals provided by the data processing system. The comparator compares the state of the group of binary control signals received with the state of the group of output signals delivered by the register and generates an end-indicating signal at an output terminal thereof when the two states compared thereby are equal. The end-indicating signal denotes that the state of the group of binary control signals has progressed through a complete cycle since the moment at which they were inserted into the register. The end-indicating signal is then delivered to a point where it may initiate performance of the specified function.

Accordingly, the instant invention, by employing an inexpensive store such as a register for cooperating with signals which are available in a data processing system, provides an accurate and inexpensive device for generating a measure of a predetermined interval following the occurrence of a particular event.

BRIEF DESCRIPTION OF THE DRAWING

The invention will be described with reference to the accompanying drawing, wherein.

DESCRIPTION OF THE PREFERRED EMBODIMENT

Figures 1, 2:
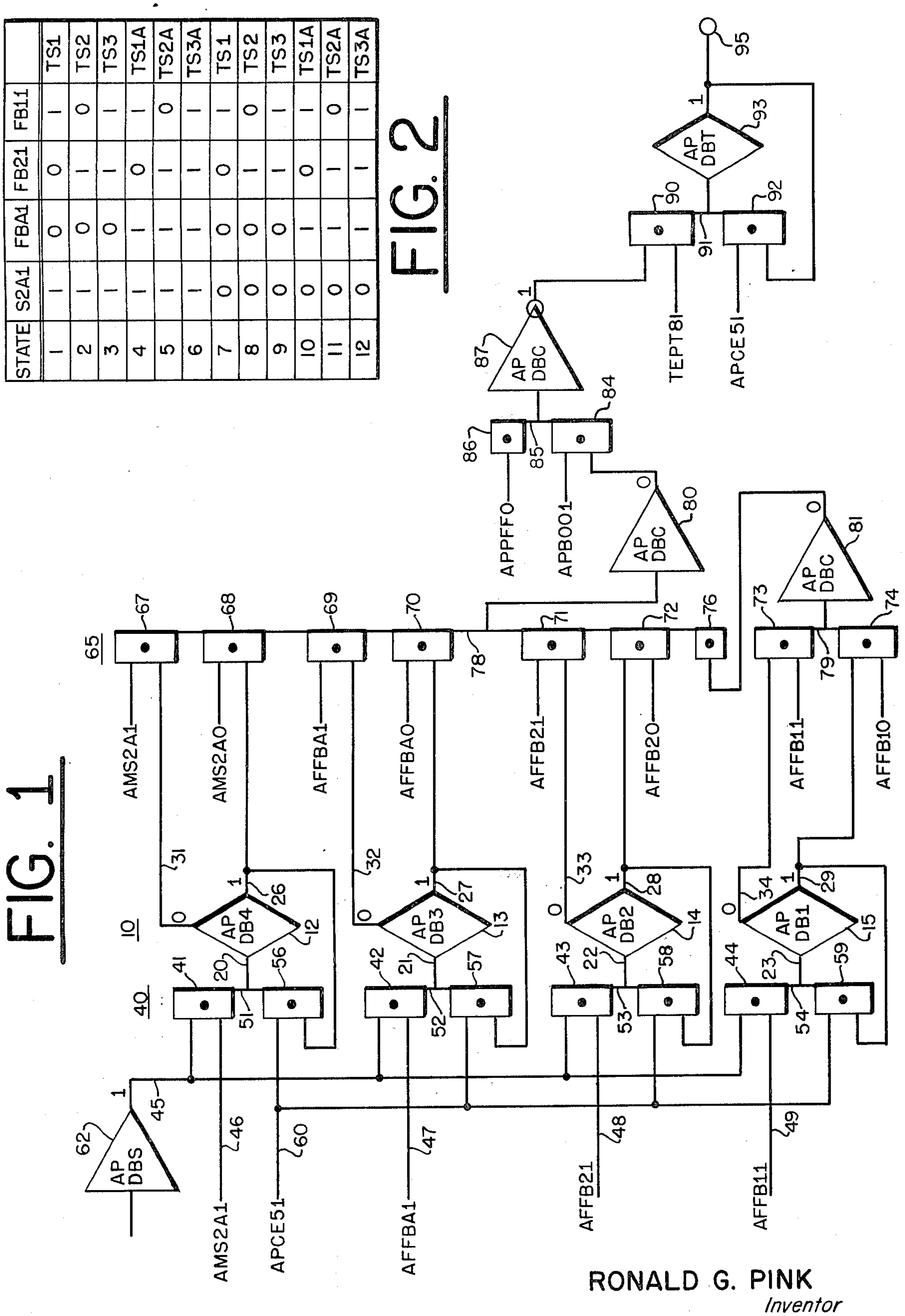
FIG. 1 is a block diagram of a timing device according to the instant invention.
FIG. 2 is a table illustrating the various binary states through which progress the group of binary control signals applied to the device of FIG. 1.

The timing device of FIG. 1 is adapted to generate a precise and accurate measure of a delay interval following the generation of start-indicating signals which denote the occurrence of respective events. The timing device automatically controls the performance of a specified function a predetermined interval after receipt of the start-indicating signal by delivering an end-indicating signal immediately after the termination of said predetermined interval. The apparatus of FIG. 1 and the data processing system with which it operates processes information represented in the binary code. In the binary code, each element of information is represented by one or more binary digit, sometimes termed "bits". The binary digit is either a 1 or a 0. In the instant embodiment, the binary 1 is represented by an electrical signal of approximately +5 volts and the binary 0 by an electrical signal of approximately 0 volts. The binary electrical signal and the respective leads on which such signals appear are designated in the system of which the apparatus of FIG. 1 is a part by a unique six-character notation. The last character of the notation represents the binary significance of the signal. If the signal is intended to represent the presence of a condition, such as the operation of an amplifier in delivering an output signal or such as the operation of a one-shot is in its unstable state, the last character will be a 1. Then if the represented condition is present, or "true", such a signal will be at +5 v level, but if not present, or "false", it will be at the 0 v level. Conversely if the signal is intended to represent the absence of a condition the last character will be a 0, whereby if the condition is, in fact, absent the signal will be at the +5 v level, but if the condition is not absent the signal will be at the 0 v level. For simplicity in the ensuing description only the last four characters of a signal notation will be employed.

The timing device of FIG. 1 comprises a store for receiving a plurality of input signals at an input terminal thereof, for storing a representation of the state of the plurality of input signals received thereby, and for delivering a set of output signals having a state corresponding to the representation stored thereby. Such a store may be, for example, a register 10.

Register 10 comprises a plurality of binary storage cells 12, 13, 14 and 15. Each such cell is adapted to receive a signal representing a binary digit, to store a representation of the binary value of the received signal, and to deliver an output binary signal corresponding to the binary representation stored thereby. Thus, cell 12 is adapted to receive a signal representing a binary digit on an input lead 20 thereof, to store a representation of the binary value of the signal received on lead 20, and to deliver an output binary signal on output lead 26 corresponding to the binary representation stored by cell 12. Similarly cells 13, 14 and 15 receive binary signals on respective input leads 21, 22 and 23, store respective representations of the binary value of the received signals, and deliver output binary signals on respective output leads 27, 28 and 29 corresponding to the respective binary values stored.

Each of cells 12–15 may be a bistable device such as a flip-flop. A flip-flop provides temporary storage of a binary digit of information on temporary storage of a binary digit of control. A pair of output signals is delivered by the flip-flop to denote the type of binary digit that is currently being stored. The flip-flop is a circuit adapted to operate in either one of two stable states and to transfer from the state in which it is operating to the other state upon application of a respective trigger signal thereto. In one state of operation the flip-flop represents the binary 1 (1-state) and in the other state the binary 0 (0-state).

In the instant embodiment each of cells 12–15 is a form of bistable device which stores a binary 1 by recirculating a binary 1 signal from the output back to the input. When no signal is being circulated in the cell, the cell is considered to be storing a binary 0. Such a bistable device is shown, for example, in U.S. Pat. No. 3,323,110 for INFORMATION HANDLING APPARATUS INCLUDING FREELY ASSIGNABLE READ-WRITE CHANNELS by L. G. Oliari et al. Each of cells 12–15 is provided with a single input lead and with a pair of output leads. One output lead of each cell, designated as the 1- output lead and denoted by a respective one of reference numerals 26 to 29, delivers a binary 1 signal when the corresponding cell is storing a representation of a binary 1 and a binary 0 signal when a binary 0 representation is being stored. The output leads 31, 32, 33 and 34 are designated as the 0-output leads, and deliver a binary 1 output signal when the corresponding cell stores a binary 0 and a binary 0 output signal when a binary 1 is stored.

Cells 12, 13, 14 and 15 are designated in FIG. 1 by the respective notations APDB4, APDB3, APDB2 and APDB1. Correspondingly, for example, the signal delivered on the 1-output lead of the APDB4 cell is designated as the DB41 signal and the signal delivered on the 0-output lead is designated as the DB40 signal. The signals delivered on the 1- and 0-output leads of the APDB3, APDB2 and APDB1 cells are correspondingly identified.

A selective transfer means is provided with an input control terminal coupled to receive a start-indicating signal, which denotes the moment of occurence of a particular event. Such transfer means is coupled to receive a group of precisely timed binary control signals employed in the associated data processing system and to transfer these control signals to register 10 upon the occurrence of the start-indicating signal. The group of binary control signals utilized by the apparatus of FIG. 1 has an aggregate state which varies cyclically and repeats at an interval substantially equal to the delay interval required of the timing device. Such a selective transfer means may be, for example, a gating assemblage 40.

Gating assemblage 40 comprises a plurality of two input AND-gates 41, 42, 43 and 44. One input lead of each of AND-gates 41–44 is connected to a lead 45, the input control terminal for gating assemblage 40, for receiving the start-indicating signal. The other input leads 46, 47, 48 and 49 of respective AND gates 41–44 are coupled to receive the cyclically repeating binary control signals employed in the associated data processing system. Each of AND-gates 41–44 is coupled to deliver the output signal generated thereby to a respective one of OR-gates 51, 52, 53 and 54.

Gating assemblage 40 also comprises a plurality of additional two input AND gates 56, 57, 58 and 59. One input lead of each of AND gate 56–59 is connected to the respective 1-output lead of cells 12–15 to provide the recirculation path required for storing a binary 1 in such cells. The other input lead of each of AND gates 56–59 is connected to an input lead 60 for receiving a signal which enables cells 12–15 to store a binary 1. Each of AND gates 56–59 is coupled to deliver the output signal generated thereby to a respective one of OR-gates 51–54. The otuput signal generated by each of OR gates 51–54 is delivered on a respective one of leads 20–23 to a corresponding one of cells 12–15.

The AND-gate provides the logical operation of conjunction for binary 1 signals applied thereto. In the instant apparatus, since the binary 1 is represented by a positive signal, the AND-gate generates a positive output signal representing a binary 1 when, and only when, all of the input signals applied thereto are positive and represent binary 1's. For example, the symbol identified by the numeral 41 in FIG. 1 represents a two-input AND-gate. Such an AND-gate delivers a binary 1 output signal on the output lead thereof only when both of the two input signals applied thereto on respective input leads 45 and 46 represent binary 1's.

The OR-gate provides the logical operation of inclusive-or for binary 1 signals applied thereto. In the instant apparatus, since the binary 1 is represented by a positive signal, the OR-gate generates a positive output signal representing a binary 1 when any one or more of the input signals applied thereto are positive and represent binary 1's. For example, the symbol identified by the numeral 51 in FIG. 1 represents a two input OR-gate. Such an OR-gate delivers a binary 1 output signal on lead 20 when any one or both of the input signals applied thereto by AND-gates 41 and 56 represent binary 1's.

An amplifier 62, designated the APDBS amplifier, responds to a control signal from the associated data processing system at the time of occurrence of a particular event to deliver the start-indicating signal on lead 45 which signal is a short duration pulse. A group of four binary control signals employed in the data processing system is applied to input leads 46–49. This group has an aggregate state that varies cyclically. The state of at least a subset of the group of control signals repeats at an interval substantially equal to the required delay interval. The signals of this group are designated respectively as the S2A1, FBA1, FB21, and FB11 signals.

Upon the occurrence of the start-indicating signal, designated as the DBS1 signal, on line 45, each one of AND-gates 41–44 which receives a binary 1 control signal on the respective one of leads 46–49 transmits a binary 1 signal through the corresponding one of OR-gates 51–54 to a respective one of cells 12–15, thereby entering a binary 1 into such cells. A store-enabling signal, the CE51 signal, is supplied on lead 60 to one input lead of each of AND gates 56–59. When the store-enabling signal is a binary 1 each of AND gates 56–59 is enabled to provide for recirculation of the binary 1 output signal of the corresponding one of cells 12–15, thereby enabling storage of a binary 1 in such cells. When the store-enabling signal reverts to a binary 0 recirculation is inhibited by AND gates 56–59, each of cells 12–15 ia reset to store a binary 0, and register 10 is thereby cleared.

The timing device also comprises a comparator 65 coupled to receive the cyclical control signal group supplied by the data processing system and the set of output signals delivered by register 10. Comparator 65 compares the state of the group of control signals with state of the set of register output signals. If the two states compared satisfy a predetermined relation, comparator 65 delivers a binary 1 output signal to denote a successful comparison, to indicate the end of the required delay interval, and to initiate performance of a specified function. In the illustrated embodiment a successful comparison occurs when the two states being compared are alike. Comparator 65 also has the capability for selectively comparing the state of a subset of the control signals with the state of a subset of the output signals delivered by register 10.

Comparator 65 comprises a plurality of two-input AND-gates 67, 68, 69 70, 71, 72, 73 and 74. One input lead of each of AND gates 67–74 is connected to an output lead of one of cells 12–15. The other input lead of each of AND-gates 67–74 is connected to receive a control signal of inverse binary sense to that received from the corresponding binary cell. For example, AND-gate 67, is coupled to the 0-output lead of the APDB4 cell, thereby receiving the DB40 output signal delivered by such cell, and is coupled to receive the S2A1 control signal, the state of which is stored by the APDB4 cell at the time of occurrence of the start-indicating signal. Conversely, AND-gate 68 is coupled to the 1-output lead of the APDB4 cell and to receive the S2A0 signal. The S2A0 signal is the binary inverse of the S2A1 signal, being a binary 0 when the S2A1 signal is a binary 1, and vice versa.

Comparator 65 also comprises an additional AND-gate 76. Each of AND-gates 67-72 and 76 is coupled to deliver the output signal generated thereby to OR-gate 78, an AND-gates 73 and 74 are coupled to deliver their output signals to an OR gate 79.

Comparator 65 also comprises a pair of amplifiers 80 and 81, a pair of AND-gates 84 and 86, an OR-gate 85, and an inverting amplifier 87. The output signal delivered by OR-gate 78 is applied to amplifier 80 and the output signal delivered by OR-gate 79 is applied to amplifier 81. The output signal delivered by amplifier 81 is applied to AND-gate 76.

The output signal delivered by amplifier 80 is applied to one input lead of the two-input AND-gate 84. The other input lead of AND-gate 84 is coupled to receive the B001 control signal. The output signal delivered by AND gate 84 is applied to OR-gate 85. AND-gate 86 is coupled to receive the PFF0 control signal and to deliver its output signal to OR-gate 85. The PFF0 signal, which normally represents a binary 0, enables the timing device to deliver output signals. The B001 signal which normally represents a binary 1, enables the timing device to generate measures of delay intervals. However, the delay interval measured by the timing device may be prematurely terminated in order to speed certain operations in the data processing system. In such situations the B001 signal becomes a binary 0 and the timing device delay interval is terminated.

The output signal delivered by OR-gate 85 is applied to inverting amplifier 87. Amplifier 87 "inverts" the input signals, providing an output signal which is the binary inverse of the input signal received thereby. The output signal delivered by amplifier 87 constitutes the output of comparator 65. In normal operation, comparator 65 delivers a binary 1 output signal when the state of the group of four binary control signals, the S2A1, FBA1, FB21, and FB11 signals, becomes the same as the state of the set of binary representations stored in cells 12–15. Because of the logical inversion function provided by inverting amplifier 87, the comparison function is effected through the application of logical inverse signal pairs to each of AND-gates 67–74.

Normal operation of comparator 65 takes place when the state of all four control signals is compared with the state of all four binary representations stored in cells 12–15. However, it is within the scope of the invention to selectively control the comparator to simulate that the contents of one of the cells is as always "matching" the corresponding control signal, whereby comparator 65 is not responsive to the contents of such cell in effecting a comparison operation. Instead, amplifier 87 delivers a binary 1 output signal, denoting successful comparison, when the state of the representations stored in the remaining three cells is the same as the state of the subset of three corresponding control signals. In this selective mode of operation a shorter delay interval is measured by the timing device of FIG. 1.

One manner in which this selective mode of operation may be implemented is to employ a pair of three-input AND-gates for receiving the output signals of one of cells 12–15 and the corresponding binary control signals. A controllable binary signal is coupled to the third input lead of both of these AND-gates. When this controllable binary signal represents a binary 1, all four control signals and cells are effective in the comparison function, but when the controllable signal represents a binary 0, comparator 65 is not responsive to the contents of the cell involved. For example, in place of two-input AND-gates 67 and 68, a pair of three-input AND-gates may be connected to receive the output signals of cell 12, the binary control signal S2A1 and its binary inverse S2A0 signal, and the controllable binary signal. In this instance, when the controllable binary signal represents a binary 0, comparator 65 compares only the state of the subset of FBA1, FB21, and FB11 control signals with the state of the binary representations stored in cells 13, 14 and 15.

The comparator output signal delivered by inverting amplifier 87 is applied to one input lead of a two-input AND-gate 90. The other input lead of AND-gate 90 is coupled to receive a very short duration clock pulse PT81, which determines the precise time at which the circuit of FIG. 1 is to deliver the end-indicating signal. The output signal of AND-gate 90 is applied to an OR-gate 91. A second two-input AND-gate 92 is also coupled to OR-gate 91. A binary storage cell 93, designated by the notation APDBT, receives the output signal delivered by OR-gate 91 for storing a representation of the end-indicating signal. One input lead of AND-gate 92 is connected to the binary 1 output lead of cell 93 to provide for recirculation and storage of a binary 1 representation in cell 93. The other input lead of AND-gate 92 is coupled to receive the aforementioned CE51 signal, which at this point in the circuit enables recirculation and storage of a binary 1 in cell 93. The DBT1 output signal delivered by cell 93 to an output terminal 95 of the timing device is the end indicating signal. This end-indicating signal may be employed for initiating performance of a specified function a predetermined interval after the occurrence of the particular event denoted by the delivery of a start-indicating signal on lead 45.

OPERATION OF THE EMBODIMENT

The table of FIG. 2 illustrates the binary states of the group of four binary control signals provided by the data processing system and employed by the timing device of FIG. 1. The particular group of four binary control signals illustrated progresses cyclically through 12 different states during a complete cycle, occupying each state for 2 microseconds and repeating each state every 24 microseconds. Therefore, according to the instant invention, this group of four control signals may be utilized to provide a 24-microsecond delay interval.

For reference purposes, the 12 different states shown in FIG. 2 are designated respectively as state-1 through state-12. The state of the subset of the FBA1, FB21, and FB11 binary control signals repeat each 12 microseconds. The six different states of this subset are designated respectively as the TS1, TS2, TS3, TS1A, TS2A, and TS3A states. Therefore, the FBA1, FB21, and FB11 signals according to the present invention, may be utilized to provide a 12-microsecond delay interval. This shorter delay interval can be implemented by eliminating S2A1 control signal and the APDB4 cell output signals from the comparison function by selective gating which simulates equality for the two binary values represented.

Figure 3:
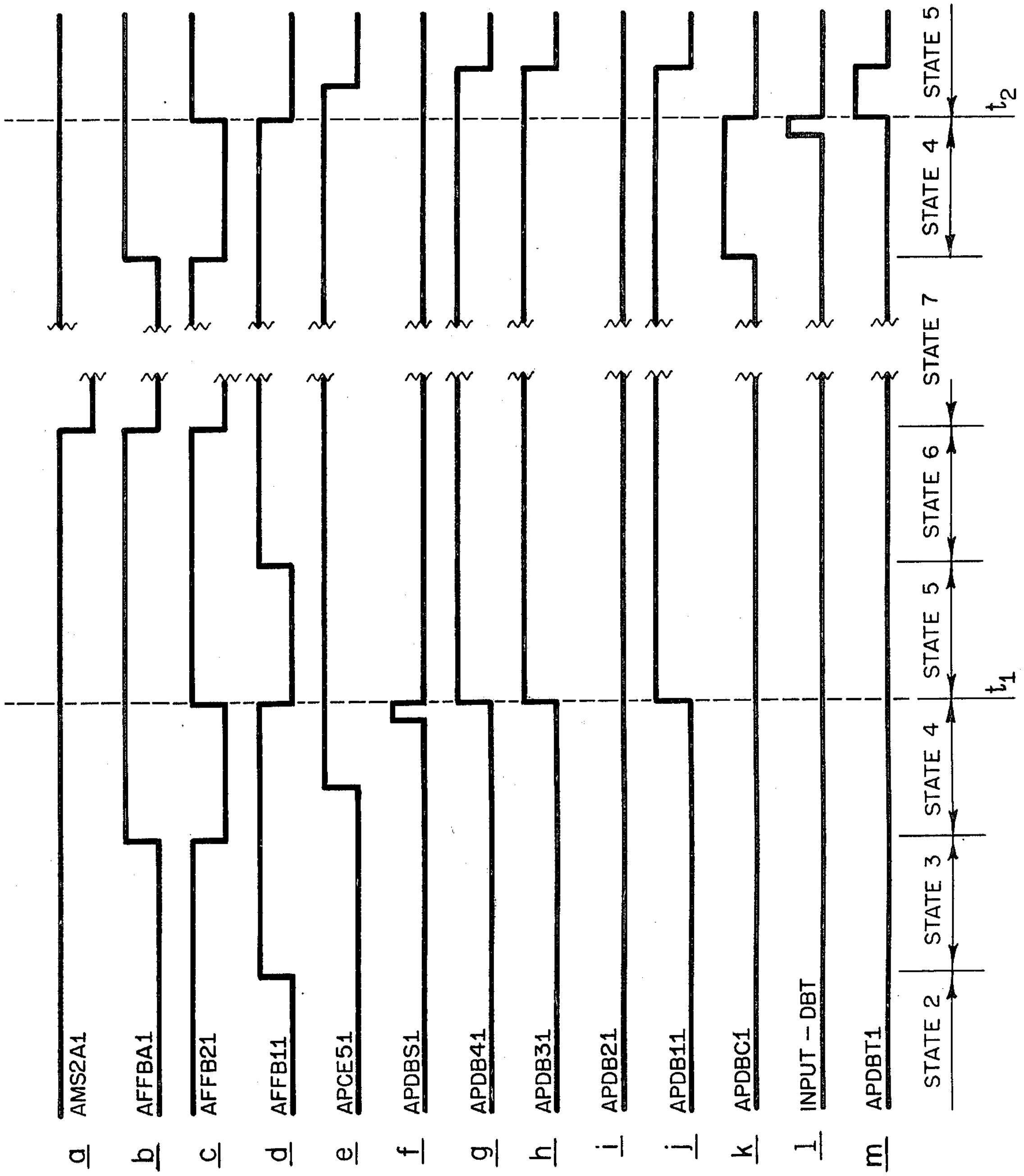
FIG. 3 illustrates waveforms of significant signals in the device of FIG. 1.

Waveforms *a, b, c* and *d* of FIG. 3 illustrate the progression of the S2A1, FBA1, FB21 and FB11 binary control signals through various states in correspondence with FIG. 2 It will be assumed, for purposes of the instant description of operation, that the particular event from which the timing device is to measure a delay interval occurs during state of the control signals. Accordingly, in the early part of the period of state-4 the CE51 store-enabling signal becomes a binary 1, waveform *e*, to enable the storage of binary 1's in cells 12–15. Next, immediately prior to the end of state-4 the start-indicating pulse DBS1 is delivered on lead 45 and applied to each of AND gates 41, 42, 43 and 44, waveform *f*, to enable the transfer to the corresponding cells 12–15 of the respective control signals S2A1, FBA1, FB21, and FB11. Accordingly cell 12 receives and stores a binary 1, which is the binary value of the S2A1 control signal in state-4. Similarly, cell 13 receives and stores a binary 1, cell 14 receives and stores a binary 0, and cell 15 receives and stores a binary 1. Thus, commencing at the beginning of state-5 cells, 12–15 store the binary state 1101, as illustrated by the respective waveforms *g, h, i* and *j* of FIG. 3.

Comparator 65 now continuously compares the binary state stored in register 10 with the changing state of the group of four binary control signals. So long as the two states compared are unlike, the comparator output signal, waveform *k*, of inverting amplifier 87 continues as a binary 0. However as soon as the control signals return to state-4, the output signal of inverting amplifier 87 changes to a binary 1 to denote a successful comparison. Thus, waveform *k* illustrates delivery of a binary 1 output signal for the full duration of the second-occurring state-4.

The clock pulse PT81, which occurs at the end of the period of each state, and is applied to AND-gate 90, now provides for delivery of a pulse, waveform *l*, to binary cell 93 at the end of the state-4 in which AND-gate 90 is enabled by the binary 1 output signal of inverting amplifier 87. This pulse delivered to cell 93 denotes that comparator 65 has made a successful comparison between the two binary states being compared during the current state period.

Cell 93 which has been enabled to store a binary 1 by the aforementioned CE51 signal that continues as a binary 1, waveform *e*, now receives and stores a binary 1, delivering a corresponding binary 1 output signal to output terminal 95, waveform M. This output signal is the end-indicating signal and may be utilized to initiate the performance of a specified function.

Shortly after the generation of the end-indicating signal, the CE51 store-enabling signal returns to a binary 0, waveform *e*, inhibiting RE-CIRCULATION of signals in cells 12–15 and 93 and thereby clearing register 10 and preparing the timing device for another operation. Although not shown in the drawing, it is apparent that the CE51 signal may be terminated in response to the occurrence of any one of the signals shown in waveforms *k, l* or *m*.

Accordingly there has been shown herein apparatus for providing a simple, inexpensive, precise and accurate measure of time. Such device has been demonstrated to provide for automatic controlling the performance of a specified function following a predetermined interval after the occurrence of a particular event. Although the principles of the invention have now been made clear in an illustrative embodiment, there will be immediately obvious to those skilled in the art many modifications in structure, arrangement, proportions and components used in the practice of the invention, and otherwise, which are particularly adapted for specific environments and operating requirements, without departing from those principles. The appended claims are therefore intended to cover and embrace any such modifications, within the limits only of the true spirit and scope of the invention.

I claim;

1. Apparatus for generating a measure of a predetermined interval following the occurrence of a start-indicating signal and for signalling the end of said interval by delivering an end-indicating signal said apparatus being employed with a system generating a plurality of control signals wherein the state of said plurality of control signals varies cyclically, comprising in combination:

means for generating said start-indicating signal independently of said end-indicating signal and at a time different from the time of delivering of said end-indicating signal;

a store for receiving a plurality of input signals at input terminals thereof, for storing a representation of the state of the plurality of input signals received thereby, and for delivering a set of output signals having a state corresponding to said representation;

selective transfer means provided with an input control terminal coupled to receive said start-indicating signal, said transfer means being coupled to receive said plurality of control signals and being coupled to the input terminals of said store for transferring the control signals received thereby to said input terminals upon the occurrence of said start-indicating signal; and a comparator provided with an output terminal, said comparator being coupled to receive said plurality of control signals and being coupled to said store to receive said set of output signals, said comparator for selectively comparing the state of only a portion of said plurality of control signals with the state of only a portion of said set of output signals and delivering said end-indicating signal at said output terminal when the portions of the two states compared thereby satisfy a predetermined relation, said predetermined relation being equality.

2. A timer for use with equipment providing a group of binary signals wherein the aggregate state of said binary signals varies cyclically, wherein said timer delivers an output control signal to denote the end of an interval, comprising in combination:

a register comprising a plurality of binary storage cells, said register receiving a group of input binary signals at input terminals thereof, storing a representation of the binary value of each input signal received thereby in a respective one of said cells and delivering a group of output binary signals corresponding to the binary representation stored in said cells;

controllable gating means provided with an input control terminal and coupled to receive the group of binary signals provided by said equipment and to transfer the binary signals received thereby to said input terminals of said register upon the application of an input control signal to said input control terminal;

means for selectively applying said input control signal to said input control terminal independently of said output control signal and at a time different from the time of delivery of said output control signal; and, a comparator provided with an output terminal, said comparator being coupled to receive the group of binary signals provided by said equipment and the group of output binary signals delivered by said register, said comparator for selectively comparing the states of only a portion of said two binary signal groups and delivering said output control signal on said output terminal when the two portions of said states compared thereby satisfy a predetermined relation, said predetermined relation being equality.

* * * * *